Aug. 1, 1944.    F. ANDREA    2,354,935
LOCKING DEVICE FOR CANS
Filed Sept. 21, 1942    2 Sheets-Sheet 1

INVENTOR
FRED ANDREA
By Paul, Paul & Moore
ATTORNEYS

Aug. 1, 1944. F. ANDREA 2,354,935
LOCKING DEVICE FOR CANS
Filed Sept. 21, 1942 2 Sheets-Sheet 2
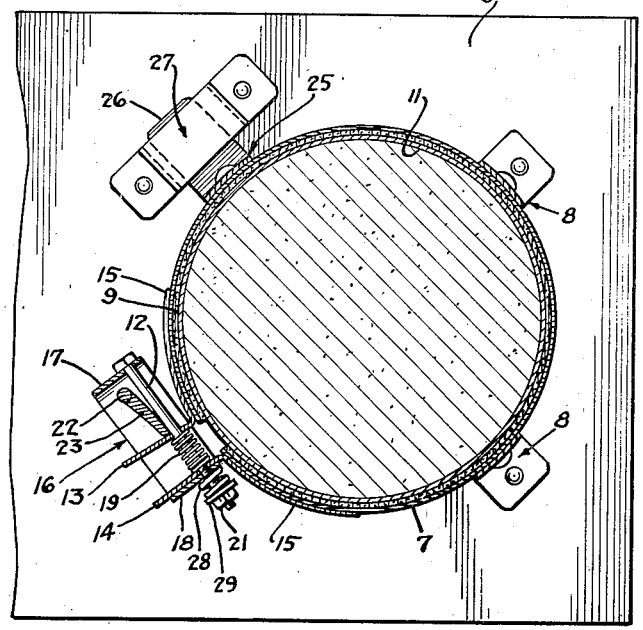
Fig.7
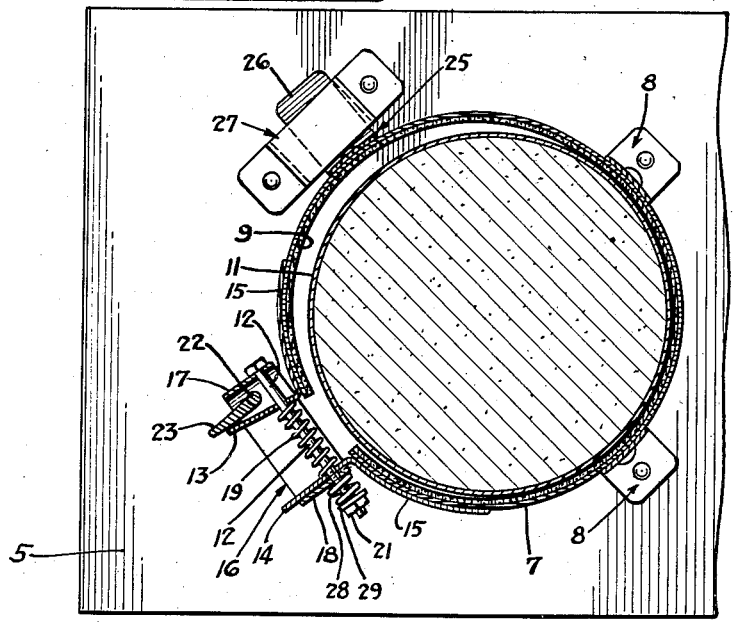
Fig.5
Fig.6
INVENTOR
FRED ANDREA
By Paul, Paul & Moore
ATTORNEYS Patented Aug. 1, 1944

2,354,935

UNITED STATES PATENT OFFICE 2,354,935

LOCKING DEVICE FOR CANS

Fred Andrea, New Richmond, Wis.

Application September 21, 1942, Serial No. 459,195

3 Claims. (Cl. 248—361)

This invention relates to new and useful improvements in locking devices for cans, and more particularly to such a device adapted for use in a refrigerating cabinet to prevent a conventional ice cream can from relatively rotating or shifting its position therein, when scooping hard frozen ice cream therefrom.

In places where ice cream is dispensed in small quantities, the ice cream is usually delivered to the dispenser in large cans. These cans are kept in a refrigerating cabinet, and are provided with closures whereby access may be had to the contents of the container or can. To obtain the maximum number of ice cream cones from a filled can of ice cream, it is quite essential that the ice cream be kept frozen fairly hard, so that it will not readily squeeze into the bottom of the cone, while inserting the charge of ice cream into the cone. When the ice cream in the can is relatively hard, it is usually necessary to "scrape" the frozen ice cream from the top of the ice cream in the can with the usual small scoop provided for that purpose, which frequently tends to relatively rotate the can in the freezing chamber, which may interfere with removing the ice cream from the can. Such relative rotation of the can in the freezing chamber is therefore annoying and objectionable, in that it may greatly retard or impede the operation of scooping the hard frozen ice cream from the container. It is therefore highly desirable that some means be provided whereby the ice cream can or container may be securely locked against rotation in the refrigerating chamber, and whereby the operation of scooping ice cream therefrom may be expedited.

Attempts have heretofore been made to lock ice cream cans or containers against rotation in refrigerating cabinets, but to the best of my knowledge, none of these have proven satisfactory or practical for various reasons. Some have been more or less loosely mounted in the refrigerating chamber, and require considerable time to apply them to the ice cream can. Others require removal from the freezing chamber each time they are to be applied to a container, and others have been found too complicated and expensive to manufacture.

The novel locking device herein disclosed was developed after considerable experimental and research work in an attempt to provide such a locking device in which all of the objectionable features heretofore present in devices of this general type, are completely eliminated.

An object of the present invention, therefore, is to provide a simple and inexpensive locking device for ice cream cans of the class described, which may readily and quickly be installed in a refrigerating chamber in a permanent manner, and whereby it is so positioned that the ice cream can may readily be lifted into and out of the refrigerating chamber, and securely locked therein by the manipulation of a single operating handle, conveniently located adjacent to the top of the refrigerating chamber.

A further object resides in the location of the locking device which comprises a resilient friction band which normally is expanded to receive the lower end of the can, and which band is provided with a simple operating device for contracting it to grip the can.

Other objects of the invention reside in the construction of the locking band and its supporting means, whereby it may be permanently secured to the usual abutment or reinforcing plate formed in the bottom of many conventional refrigerating chambers; in the unique construction of the operating means for the friction band whereby it may be operated to grip the can by the simple manipulation of a single operating handle; and in the construction of the locking or friction band whereby it may be readily constructed of ordinary strap material which may be faced with a suitable friction material such as rubber or fabric, to increase the gripping action of the band upon the body of the can.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 5 is a detail sectional view on the line 5—5 of Figure 2;

Figure 6 is a view similar to Figure 3, but showing a locking band provided with a slightly different type of operating device; and Figure 7 is a view corresponding to Figure 6, but showing the band contracted to grip the ice cream can or container.

Figure 1:
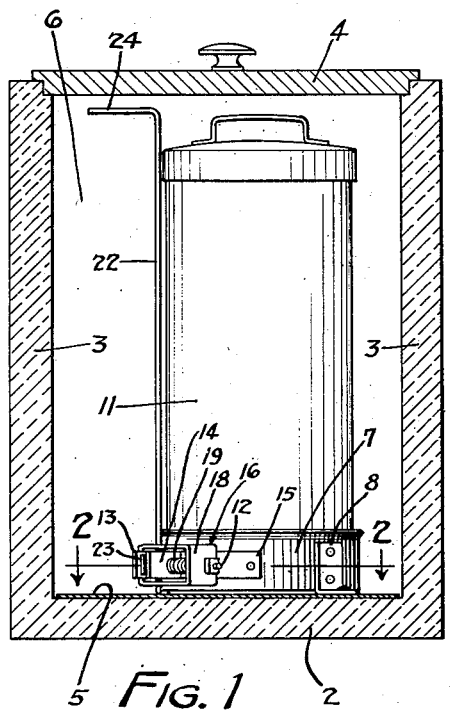
Figure 1 is a sectional elevational view of a conventional refrigerating cabinet, showing the invention mounted therein and supporting an ice cream can.

In the selected embodiment of the invention here shown, there is illustrated in Figure 1, for purposes of disclosure, a refrigerating cabinet which may be of any conventional design, comprising a bottom wall 2, side walls 3, and a closure or cover 4 for closing the open top of the cooling chamber 6. A suitable abutment or reinforcement plate 5 is shown supported in the bottom of the freezing chamber 6, as is customary in cabinets of this type, to protect the bottom wall 2 of the cabinet when the filled cans are inserted into the chamber 6. Operators inserting filled cans into freezing cabinets often release the cans before they contact the bottom of the cabinet, and the plate 5 is therefore provided in the cabinet to protect the bottom wall 2 from becoming damaged by the lower edges of the cans, when the filled cans are inserted or "dropped" into the chamber.

The novel invention herein disclosed is shown comprising a resilient split band 7, which preferably is of metal, and is shown mounted directly upon and secured to the reinforcing plate 5 by a plurality of angle brackets 8, having their vertically disposed legs secured to the band 7. The horizontal legs of the angle brackets 8 are secured to the plate 5, as clearly illustrated in Figure 5. A suitable facing 9, which may be of rubber or other material applicable for the purpose, is secured to the inner face of the band 7 to provide adequate friction between the band and the periphery of the can body 11, when the band is contracted, thereby to positively lock the can against relative rotation upon the supporting plate 5.

Figure 3:
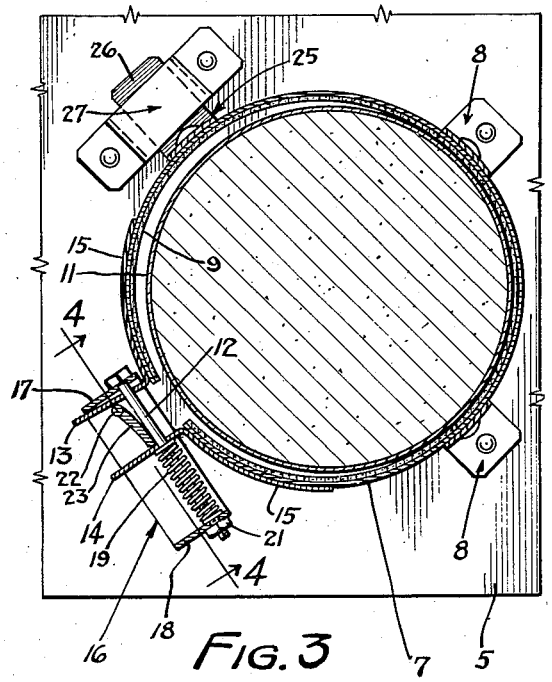
Figure 3 is a view similar to Figure 2, but showing the band expanded to release the can.
Figure 2:
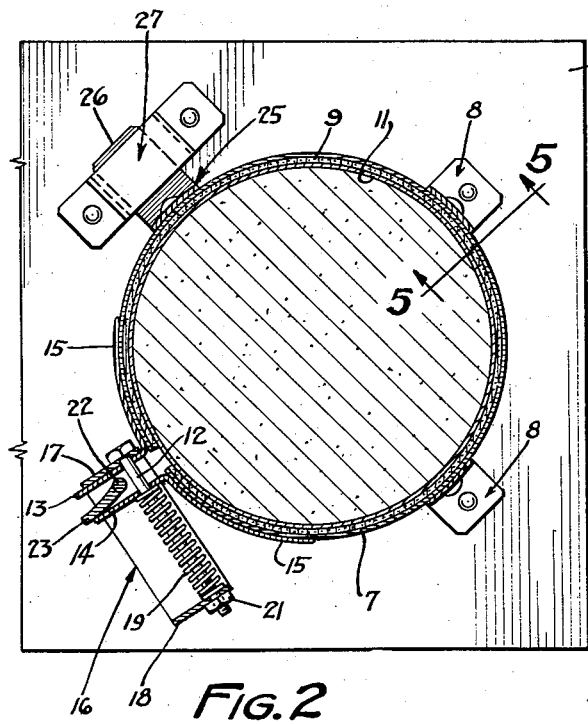
Figure 2 is a sectional plan view on the line 2—2 of Figure 1, showing the band contracted to grip the container.

In the form shown in Figures 1 to 5, inclusive, a bolt or rod 12 is received in suitable apertures provided in the outwardly turned ends 13 and 14 of the ends of the friction band 7, as clearly shown in Figures 2 and 3. The end portions 13 and 14 of the band may be in the form of separate brackets 15 secured to the ends of the band, or, if desired, they may be integrally formed with the ends of the band.

A box-like frame 16 is supported on the bolt 12, and preferably encircles the outwardly extending ends 13 and 14 of the band 7, as shown in Figures 2 and 3. The end walls 17 and 18 are apertured to receive the bolt 12. A suitable spring 19 is mounted on the bolt 12 between the end 14 of the band and the wall 18 of the frame 16, and serves to constantly move the end portion 14 of the band in a direction towards the band end 13, thereby to contract the band. A suitable nut 21 is received in threaded engagement with the end of the bolt 12, thereby to secure the frame to the bolt and in position with respect to the end portions 13 and 14 of the band. If desired, the end wall 17 of the frame 16 may be secured to the band end 13 to render the apparatus slightly more secure. In actual operation, however, I have found it unnecessary to thus secure the frame end wall 17 to the band end 13.

Figure 4:
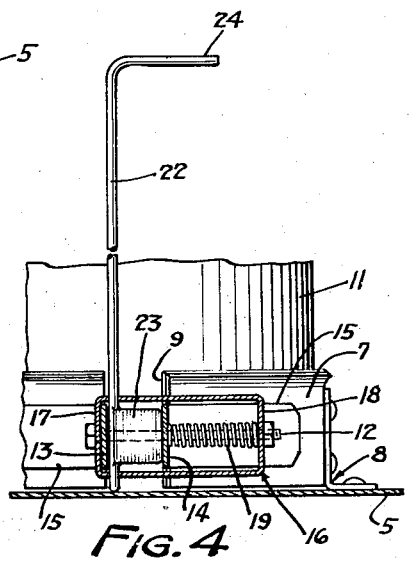
Figure 4 is an enlarged detail sectional view on the line 4—4 of Figure 3.

An operating rod 22 is mounted for pivotal movement in the upper and lower walls of the box-like frame 16, and carries an arm 23, adapted to engage the adjacent face of the end 14 of the friction band 7, thereby to expand the band, as will readily be understood by reference to Figures 3 and 4. The upper end of the rod 22 has an operating handle 24 which, as best illustrated in Figure 1, is positioned adjacent to the upper end of the can 11 whereby it may be conveniently operated, when the cover 4 of the refrigerating chamber is opened or removed.

In the form of the invention as shown in Figures 1 to 5, the engagement of the band with the lower portion of the can is obtained by the action of the spring 19 which, as will be readily understood by reference to Figures 2 and 3, will draw the ends of the band towards one another and thereby contract the band against the can, when the arm 23 of the operating rod 22 is in its inoperative position, shown in Figure 2.

In addition to the angle brackets 8, a third angle bracket 25 may be provided as an additional support for the band 7, and is shown having its lower horizontal end portion 26 guidingly supported in a guide clip 27, secured to the supporting plate 5. By thus guidingly supporting the end portion 26 of the bracket 25, the band may readily be expanded or contracted, as will readily be understood.

A small compensating spring 28 is preferably mounted on the rod or bolt 12 between the end wall 18 of the bracket 16 and a washer 29 mounted on the bolt and retained thereon by the nut 21. The spring 28 is relatively stiffer than the spring 19, and serves to adapt the brake band 7 to cam bodies of varying diameters.

In Figures 6 and 7 I have shown a can-holding device which is very similar to the one shown in Figures 1 to 5, inclusive, except that the operating parts for the brake band 7 are so arranged that the band is contracted by a positive action, and is expanded by the action of the spring 19. In Figures 6 and 7 it will be noted that the spring 19 is interposed between the terminals 13 and 14 of the friction band 7, whereby the spring constantly tends to expand the band, as will readily be understood by reference to Figure 6. The operating rod 22 is mounted in a manner similar to the one shown in Figures 1 to 4, inclusive, and when rotated will force the end portion 13 of the band 7 towards the end 14, as shown in Figure 7, whereby the band is contracted and will frictionally engage the bottom of the can and positively secure it against rotation on the supporting plate 5.

The novel apparatus herein disclosed has been found very practical in actual operation. It is preferably mounted directly upon the supporting plate 5, whereby it may remain permanently in the freezing chamber and will not get out of position therein. It may be quickly remove from the refrigerating chamber for cleaning purposes by simply removing it therefrom together with the plate 5. The operating handle 24 is conveniently located adjacent to the cover 4 of the refrigerating chamber whereby the locking device may readily be operated without having to stoop and reach into the chamber 6, as is customary in some devices of this type now in use. By contracting the band, as shown in Figures 2 and 3, by the action of the spring 19, variations in the diameter of the can will not effect the clamping action of the band upon the can, which is desirable in that there is sometimes a slight variation in the diameters of cans of different manufacture.

In the form shown in Figures 6 and 7, the diameter of the band, when contracted, must be adjusted more or less to fit a given size can be-
cause the contraction of the band is controlled
entirely by the length of the arm 23 on the lower
end of the rod 22. Such adjustment, however,
may be conveniently accomplished by relatively
rotating the nut 21 on the bolt 12.

In the drawings I have shown the locking device, including the band 7, and its operating means, as being mounted upon and secured to the reinforcing plate 5. In refrigerating installations where such a plate is not employed, the friction band 7 may be mounted in the lower portion of the refrigerating chamber, and suitably anchored or secured to the bottom wall of the chamber 6, or to one of its upright walls, without departing from the scope of the invention. Mounting the locking device upon a removable plate or false bottom such as the plate 5, is desirable, however, in that it provides a unitary locking device for the cans, which is intact and may readily be removed from the cooling chamber as a complete unit.

It will be apparent to those skilled in the art that I have accomplished at least the principal objects of my invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. A can holder comprising a support, a split locking band mounted on said support, a spring having one end engaged with one end of the locking band, a member carried by the band and providing a support for the opposite end of the band whereby the spring constantly tends to contract the band, and rotatable means carried by said member for expanding the band to permit a can to be seated thereon.

2. A can holder comprising a support, a split locking band mounted on said support and having outwardly projecting terminals, a bolt traversing said terminals, a supporting member mounted on the bolt, a spring constantly tending to contract the band, and an operating rod carried by the supporting member, whereby the operation of the band may be readily and quickly accomplished.

3. In a device of the class described, a supporting plate, a split locking band having suitable brackets securing the intermediate portion thereof to the supporting plate, a box-shaped member embracing the ends of the locking band, a spring interposed between one end of said box-shaped member and the adjacent end of the locking band and constantly tending to contract the band, an operating rod rotatably supported in said box-shaped member and having an arm adapted to engage the movable end of the locking band, and an operating handle at the upper end of the rod whereby the locking band may be conveniently operated to secure a can against rotation on said plate.

FRED ANDREA.